(12) United States Patent
Starks

(10) Patent No.: US 9,163,197 B1
(45) Date of Patent: Oct. 20, 2015

(54) METHODS OF EXTRACTING PHYTOCHEMICALS FROM SORGHUM BRAN

(71) Applicant: Milex Corporation, Fort Worth, TX (US)

(72) Inventor: Aubrie N. Starks, Haltom City, TX (US)

(73) Assignee: Milex Corporation, Fort Worth, TX (US)

( * ) Notice: Subject to any disclaimer, the term of this patent is extended or adjusted under 35 U.S.C. 154(b) by 0 days.

(21) Appl. No.: 14/288,569

(22) Filed: May 28, 2014

(51) Int. Cl.
| | | |
|---|---|---|
| C11B 1/10 | (2006.01) | |
| C11B 3/00 | (2006.01) | |
| C11B 7/00 | (2006.01) | |
| C11B 11/00 | (2006.01) | |

(52) U.S. Cl.
CPC . *C11B 1/10* (2013.01); *C11B 3/006* (2013.01); *C11B 7/00* (2013.01); *C11B 11/00* (2013.01); *C11B 7/0016* (2013.01); *C11B 7/0025* (2013.01)

(58) Field of Classification Search
None
See application file for complete search history.

(56) References Cited

U.S. PATENT DOCUMENTS

| | | | |
|---|---|---|---|
| 2,759,956 | A * | 8/1956 | Pominski et al. ............... 554/15 |
| 3,481,960 | A * | 12/1969 | Hunnell et al. ............... 554/196 |
| 4,313,880 | A | 2/1982 | Redaelli |
| 5,705,618 | A * | 1/1998 | Westcott et al. ............. 530/500 |
| 5,713,526 | A * | 2/1998 | Martin et al. .................... 241/74 |
| 5,820,039 | A | 10/1998 | Martin et al. |
| 6,312,753 | B1 | 11/2001 | Kealey et al. |
| 6,894,136 | B2 | 5/2005 | Markham et al. |
| 6,939,937 | B2 | 9/2005 | Markham et al. |
| 6,965,005 | B2 | 11/2005 | Markham et al. |
| 8,541,045 | B2 | 9/2013 | Kealey et al. |
| 2005/0160662 | A1 * | 7/2005 | Jordan ........................... 44/329 |
| 2007/0014912 | A1 * | 1/2007 | Mazza et al. .................. 426/615 |
| 2007/0141178 | A1 * | 6/2007 | Empie et al. .................. 424/725 |

OTHER PUBLICATIONS

Agbangnan D., P.C., et al., optimizatin of hte extractin of sorghum's polyphemols for industirl production by membrane processes, 2012, Research journal of Recent Sciences, vol. 1(4), pp. 1-8.*
Anwar, F. et al., Effect of solvents extraction on total phenolics and antioxidant activity of extracts from flaxseed, 2012, Acta Sci. Pol., technol aliment, vol. 11(3), pp. 293-301.*
Awika, J.M., et al., Sorghum phytochemicals and their potential impact on human health, 2004, Phytochemistry, vol. 65, pp. 119-1221.*
Awika, J. M., et al., Screenng mehtods to measure antioxidant activity of sorghum and sorghum products, 2003, J. Agric. Food Chem., vol. 51, pp. 6657-6662.*
Barros, F. et al., Accelerated solvent extraction of phenolic comounds from sorghum, 2013, Journal of Cereal Science, vol. 58, pp. 305-312.*
Chavan, J.K., et al., Removal of tannins and improvemtn of in vitro protein digestibility of sorghum seeds bo soaking in alkali, 1979, Journal of Food Science, vol. 44, pp. 1319-1321.*
Dalton, J.S. et al., Fractionation of sorghu gran wax, 1959, Agricultural and food chemistry, vol. 7, No. 8, pp. 570-573.*
Kim J., Wax extracxtion and characterizatin from full-fat and defatted rice bran, 2008, Dissertation to Graduate facultiy of Louisiana State University, 135 pages.*
Polycarpe Kayode, A.P., et al., Uncommonly high levels of 3-deosyanthocyanidins and antioxidant capacity n the leaf sheaths of dye sorghum, 2011, J.Agric. Food. Chem, vol. 59, pp. 1178-1184.*
Cooperative Extension Service, University of Arkansas, Grain Sorghum Production Handbook, 2004, pp. 1-75, MP297-3M-1-04RV.

* cited by examiner

*Primary Examiner* — Yate K Cutliff
(74) *Attorney, Agent, or Firm* — Grady K. Bergen; Griggs Bergen LLP

(57) ABSTRACT

A method of extracting phytochemical products from *sorghum* is achieved by treating a *sorghum* bran material composed of removed outer portions of whole *sorghum* seeds. The removed outer portions constitute those portions of the outer 40% or less by weight of the whole *sorghum* seeds. By utilizing different treatment techniques, phytochemical products of fats and oils, pigments, waxes, and antioxidants can be obtained from the *sorghum* material.

20 Claims, No Drawings

METHODS OF EXTRACTING PHYTOCHEMICALS FROM SORGHUM BRAN

BACKGROUND

Phytochemicals are chemical elements and compounds that are produced naturally within plants. As such, phytochemicals are deposited in various combinations and amounts within the different anatomical components of the plant, including roots, stalks, stems, leaves, seeds, and the fruit of the plant. Certain phytochemicals are considered responsible for basic physical characteristic properties of the host plant, including its color, odor, taste, texture, etc. Phytochemicals may also determine the nutritive and pharmacological properties of the plant. For centuries, specific phytochemical substances have been utilized in medical applications, either as processed plant components or extractions of plant components, without a full understanding or knowledge of the active chemical compounds.

Sorghum is a domesticated plant well known to man. It has been hybridized since early Egyptian times and is highly diversified in its varieties. As used herein, the terms "sorghum" and "milo" may be used interchangeably. In the United States, varieties of sorghum have few uses other than for animal feed or as a less expensive feed grain substitute for corn or wheat. In other parts of the world, particularly Africa and Asia, sorghum is used for flour and human food.

There are four major chemical classifications of phytochemical substances that have been found in sorghum plant components. These include 1) fats and oils, 2) pigments, 3) waxes, and 4) antioxidants. Each of these components may be useful and have significant value if removed or separated from the sorghum plant, as well as other non-sorghum plants.

One of the commercial applications for sorghum is its use as an extruded matrix product that may be used for various purposes. These may include uses as a construction component, an insulation material, or a packing material. In such extrusion, the sorghum seeds or berries must first be milled or processed to remove the hull and outermost seed layer from the seeds so that only the interior of the seed is used in forming the extrudable sorghum resin. The removed hull and outermost seed layer from the milling process, which may be in the form of a powder called "bran", is typically a waste product heretofore having low or little value and may be used for such purposes as feed for livestock.

Because the removed bran, consisting of the hull and outermost seed layer, may contain significant amounts of the phytochemicals discussed above, methods for removing or separating these compounds from the bran can significantly increase its value. Accordingly, the present invention is directed to such methods.

DETAILED DESCRIPTION

The present invention provides methods for producing various products from plant matter. In particular, the products produced may include those produced from sorghum seeds, berries, or grains. In certain applications, products from other non-sorghum grain products, such as rice, wheat, corn, oats, etc. may also be produced. As used herein, the expressions "seeds," "berries," or "grains" are meant to refer to the same thing and may be used interchangeably.

Sorghum seeds are composed of three principal anatomical components. These are the pericarp, the endogerm or germ, and the endosperm. The pericarp is composed of the cutin, epicarp, mesocarp, cross cells, tube cells, testa, pedicel, and stylar areas of the sorghum seed. The endogerm is composed of the scutellum and embryonic axis. The endosperm is composed of an outer aleurone layer, a corneous zone and an innermost floury zone.

Typically, the endosperm portions of sorghum seeds are what are beneficially utilized as a resin material for use in extrusion applications for sorghum. Thus, in extrusion, the hull and outermost layers or portions (i.e., the bran) of the sorghum seed are first removed prior to extrusion. It is with respect to these removed outer layers or portions that the present invention makes use, deriving highly valuable products from what would otherwise be considered a low value byproduct or waste material.

Although, specific reference is made to sorghum seeds and materials, the present invention also has application to other non-sorghum grains or seeds. Accordingly, it should be understood that where reference is made to the use and processing of sorghum bran or other outer portions of the whole sorghum seeds, this same discussion can be construed to apply to these other non-sorghum materials, such as rice, wheat, corn, oats, etc., unless where expressly stated otherwise or is readily apparent from the context.

When producing the products from sorghum seeds according to the present invention, the removed outer portions of whole sorghum seeds may constitute the outer 40% or less by weight of the whole seeds. In particular embodiments, the outer 35% or less by weight of the whole seeds are used in producing the products described herein. In some embodiments, the removed outer portions used for producing the products described herein will constitute the outer 25% to 40% by weight of the whole seeds. In other embodiments, the removed outer portions used for producing the products in accordance with the invention will constitute the outer 25% to 35% by weight of the whole seeds.

It should be understood that with respect to any concentration or amount range listed or described herein as being useful, suitable, or the like, it is intended to include every concentration or amount within the range, including the end points, and is to be considered as having been specifically stated. For example, "a range of from 1 to 10" is to be read as indicating each and every possible number along the continuum between about 1 and about 10. Thus, even if specific data points within the range, or even no data points within the range, are explicitly identified or refer to only a specific few, it is to be understood that the inventors appreciate and understand that any and all data points within the range are to be considered to have been specified, and that the inventors are in possession of the entire range and all points within the range.

The removed outer portions of the whole sorghum seeds include the hull and outermost layer of the sorghum seeds. This includes all or a portion, which may be a majority portion, of the pericarp, including the cutin, epicarp, mesocarp, cross cells, tube cells, testa, pedicel, and stylar areas of the sorghum seed. The removed outer portions may also include all or a portion, which may be a majority portion, of the endogerm, including the scutellum and embryonic axis. The removed outer portions may also include some portions of the endosperm. This is preferably a minimal amount. If the removed outer portions include portions of the endosperm, these will typically be comprised of the aleurone layers and corneous zone, which form the outermost layers of the endosperm, although some minor amounts of the innermost floury zone may be included in the removed outer portions used in forming the products described herein. Such materials may be present as a result of the milling and/or scouring processes, as well as due to non-whole or broken seed particles that may be present along with the removed outer portions.

In some applications, the bran or removed outer portions of the whole *sorghum* seeds may be those from a single variety of *sorghum* seeds. As used herein, the expression "single variety" or "one variety" refers to plant material from a single taxonomic variety or cultivar. Such seeds or other plant matter are those that contain the same inheritable or reproducible characteristics. In other applications, the removed outer portions of the whole *sorghum* seeds may be those from more than one variety.

In processing the whole *sorghum* seeds to obtain the removed outer portions, the seeds are typically run through a clipper mill or similar equipment to remove small and/or broken seeds. The whole, uniform-sized seeds may then be run through a destoner and magnet or equivalent equipment to remove stones, pieces of metal, and other non-seed objects.

The sized, cleaned, and destoned seeds are then milled or decorticated, with or without additional scouring, to provide the bran or removed outer portions of the whole *sorghum* seed used in the methods described herein. Milling or decortication of *sorghum* seeds essentially consists of mechanical abrasion that grinds or removes the exterior portions of the whole *sorghum* seed, which includes the hull or pericarp portions of the *sorghum* seeds, as well as some or all portions of the endogerm. This grinding operation creates a powder of the removed outer portion leaving a remaining inner core particle comprised primarily of the endosperm. This inner core particle may have a reduced particle diameter from that of the original particle size of the whole *sorghum* seed and may fall within a particular particle size range. Thus, the milling or decortications operation may be carried out to reduce the whole *sorghum* seeds to an inner core particle having a final particle size range. Various methods of milling or decortication may be used, such as those methods described in U.S. Pat. Nos. 5,713,526 and 5,820,039, which are each incorporated by reference in their entireties for all purposes. Other milling or decortication techniques or methods of removing the outer portions of the seeds may also be used. The removed powder may be collected in this operation and used as the removed outer portions of whole *sorghum* seeds for the processes described herein.

After decortication, the reduced diameter seed particles or those seed particle portions remaining after decortication may be further scoured or degermed to remove any remaining endogerm portions of the seeds. Those scouring or degerming techniques described in U.S. Pat. Nos. 5,713,526 and 5,820,039 may be used. Other conventional scouring or degerming techniques may also be used in removing the endogerm from the *sorghum* seeds.

After decortication and any scouring, the *sorghum* seeds are essentially converted into two forms of material: a byproduct bran powder that is separated and removed and an inner-core particle that may be used for extrusion applications. It is with respect to this byproduct bran powder or removed outer portions of the whole *sorghum* seed, as well as other non-*sorghum* seeds, that the present invention has application. This byproduct bran powder may include the removed materials from the whole seeds with or without the endogerm material that is removed in the degerming or scouring process. In many applications, the byproduct bran powder or removed outer portions to be treated will include both the removed outer portions from the milling or decortications process and the removed endogerm portions from the degerming or scouring process. In other applications, the removed outer portions will only include exterior material removed from the milling or decortication process. In still other applications, the removed outer portions may only include those outer portions removed solely in the scouring or degerming process. As used hereinafter, the expressions "byproduct powder," "*sorghum* powder," "*sorghum* bran," "bran," "bran powder," "removed outer portions," "removed portions," "bran material," "*sorghum* material," and similar expressions, is meant to encompass the same outer material removed from the whole seeds, as has been described, which is then treated in accordance with the treatment methods described herein, unless expressly stated otherwise or is apparent from its context.

These removed outer portions of the whole *sorghum* seeds, which may be in the form of the byproduct bran powder as discussed, undergoes further treatment(s) to obtain useful and valuable products. These treatments facilitate the removal and separation of four classes of phytochemical materials from the bran powder or removed outer portions of the seeds. These include 1) fats and oils, 2) pigments, 3) waxes, and 4) antioxidants. Any one of these classes of materials may be removed and separated from the bran material. In certain instances, more than one class of material is removed from an amount of bran material in sequential treatments. Such sequential treatments may be in no particular order or may be in a particular sequential order. In some applications, a sequential order is used, with the removal of antioxidants being the last material removed. In one particular four-stage application, fats and oils are preferentially and exclusively removed in a first extraction. Pigments are preferentially and exclusively removed in a second extraction. Waxes are preferentially and exclusively removed in a third extraction. Finally, antioxidants are preferentially and exclusively removed in a fourth and last extraction. Thus, the carry-over presence of each targeted phytochemical is minimized in the following and all subsequent extraction processes.

Fats and Oils

To remove and separate fats and oils from the bran powder, the *sorghum* bran is combined with a suitable solvent. The solvent used may be a C5 to C7 hydrocarbon or a mixture of such solvents. Examples of such solvents include single compounds of pentane, hexane, heptane isomers, etc., as well as mixtures of such compounds, such as ligroin or petroleum ether. The amount of solvent used may be enough to provide a concentration of from 0.5 lb to 5.0 lbs of *sorghum* bran per gallon of solvent, more particularly from 0.5 lb to 1.5 lbs of *sorghum* bran per gallon of solvent, and still more particularly from 0.8 lb to 1.2 lbs of *sorghum* bran per gallon of solvent.

The *sorghum* bran and solvent are combined in an appropriate vessel, and the mixture is heated to facilitate extraction of the fats and oils. The heating may be carried out while agitating the mixture within the vessel (e.g., stir tank reactor) to maintain the *sorghum* bran in a substantially suspended state within the solvent so that it does not readily settle out. The agitation is typically carried out through the use of a suitable mechanical stifling mechanism(s) (e.g., propeller), although other agitation means may be used.

The heating may be carried out at temperatures of from 35° C. to 100° C. Typically, the heating temperature may be limited to the boiling temperature of the particular solvent or solvent mixture used. Thus, for n-hexane, the boiling point is about 68.7° C. Solvent vapors that evolve from the mixture during heating may be condensed and recycled back to the mixture. A reflux condenser, Soxhlet extraction unit, or similar equipment may be used for this purpose. The extraction apparatus may be commercial components configured for and/or scaled in size for producing commercial quantities of the fats and oils from the *sorghum* powder using similar techniques.

Heating, which may be at the boiling point of the solution, is carried out for an amount of time sufficient to ensure that the fats and oils are effectively extracted from the *sorghum* powder. Heating for less than 1½ hours may produce proportionately lower levels of fats and oils being extracted. Heating for periods longer than 2 hours has been shown not to increase the levels of fats and oils extracted from the *sorghum* material, however. Thus, the heating may be carried out for a period of at least 1½ hours to 2 hours to account for different rates of extraction of fats and oils in certain applications.

After heating, the mixture is immediately filtered or filtered with heating to remove the *sorghum* solids from the mixture. The solids constitute the undissolved *sorghum* bran powder. The filter media may be any suitable filter medium sufficient to filter out the *sorghum* bran particles (e.g., cloth, paper, glass fiber, or sintered glass). Filtering while the mixture is hot is done to eliminate or minimize any solidification and/or aggregation of the fats and oils in the heated liquid that could solidify at cooler temperatures. Thus, filtration techniques should be used so that there is minimal temperature drop or with heating of the solution of the liquid during or prior to filtration to avoid solidification of fats and oils. Filtering the mixture after heating using filtering techniques so that there is a liquid temperature drop of 5° C. or less through the duration of the filtering step may be suitable. Such filtration techniques may include vacuum or suction filtration techniques that result in more rapid filtration.

The *sorghum* bran solids collected after filtering may be dried to remove any remaining solvent prior to being discarded or used in further extraction processing, as has been described wherein the *sorghum* bran is used in subsequent sequential treatments. Thus, *sorghum* bran from which the fats and oils have been removed may be further processed to extract other compounds. Similarly, *sorghum* bran that is treated to remove fats and oils may be *sorghum* bran that has been previously treated to remove one or more of the other three classes of phytochemicals, as discussed previously.

After filtration, the liquid filtrate is collected, and the solvent is evaporated off to concentrate the fats and oils. Various methods may be used to achieve this, such as common distillation techniques. This may include those techniques wherein the solution is heated to the boiling point of the solvent to distill off the solvent. Vacuum distillation techniques may also be used, with or without heating. Commercial distillation equipment or solvent evaporation techniques may be used where larger quantities of material are involved. The evaporated solvent may be collected for reuse, if desired.

The fats and oils collected include both liquids and low melting point solids. The fats and oils may include fatty acids and triglycerides and triglyceride-based compounds, such as triacyl esters of glycerol.

Depending upon the specific variety of *sorghum* milled to produce the bran, the weights of fats and oils extracted from the *sorghum* bran may vary from 3% to 9% relative to the original weight of unprocessed bran used in the extraction.

Pigments

Microscopic examinations of cross sections of whole *sorghum* seeds have resulted in the identification of several types of pigments. These pigments are present primarily in the pericarp or outer hull layers. Micro analyses of seeds of red *sorghum* varieties show two yellow pigments and one orange pigment, while analyses of white *sorghum* varieties indicate one yellow and one orange pigment layer. Mass spectral analyses of these pigment materials have identified two forms of apigeninidin and two forms of luteolinidin, all of which exhibit antioxidant properties. In broad terms, these pigments have been classified as anthocyanin-type compounds, specifically, water soluble flavonoids with colors ranging from red to blue, depending upon the pH of the system.

To remove and separate pigments from the *sorghum* bran powder, the *sorghum* material is combined with a suitable solvent. The *sorghum* bran may be unprocessed *sorghum* powder or it may be *sorghum* bran that has undergone a previous extraction step or steps, such as extraction of fats and oils. The solvent used to extract pigments is typically an alcohol. Low molecular weight alcohols, such as methanol and ethanol, and mixtures of such alcohols are particularly useful as solvents. In general applications, methanol is used as the solvent due to its low boiling point and ease of distillation. The amount of solvent used may be enough to provide a concentration of from 0.5 lb to 5.0 lbs of *sorghum* bran per gallon of solvent, more particularly from 0.5 lb to 1.5 lbs of *sorghum* bran per gallon of solvent, and still more particularly from 0.8 lb to 1.2 lbs of *sorghum* bran per gallon of solvent.

The *sorghum* bran and solvent are combined in an appropriate vessel, and the mixture is heated to facilitate extraction of the pigments. The heating may be carried out while agitating the mixture within the vessel (e.g., stir tank reactor) to maintain the *sorghum* powder in a suspended state within the mixture so that it does not readily settle out. The agitation is typically carried out through the use of a suitable mechanical stirring mechanism(s) (e.g., propeller), although other agitation means may be used.

The heating may be carried out at temperatures of from 50° C. to 100° C. Typically, the heating temperature may be limited to the boiling temperature of the particular solvent or solvent mixture used. Thus, for methanol, the boiling point is about 64.7° C. For ethanol, the boiling point is about 78.4° C. Solvent vapors that evolve from the mixture during heating may be condensed and recycled back into the mixture. A reflux condenser, Soxhlet extraction unit, or similar equipment may be used for this purpose. The equipment may be commercial apparatus that is configured for and/or scaled in size for producing commercial quantities of the pigments from the *sorghum* bran using similar techniques.

Heating, which may be at the boiling point of the solution, is carried out for an amount of time sufficient to facilitate extraction of pigments from the *sorghum* bran. Heating for less than 1½ hours may produce proportionately lower levels of pigments being extracted. Heating for periods longer than 2 hours has been shown not to increase the levels of pigments extracted from the *sorghum* material, however. Thus, the heating may be carried out for a period of at least 1½ hours to 2 hours to account for different rates of extraction of pigments in certain applications.

After heating, the mixture may be immediately filtered or filtered with heating to remove the solid *sorghum* bran particles from the mixture. The filter media may be any suitable filter medium sufficient to filter out the *sorghum* particles (e.g., cloth, paper, glass fiber, or sintered glass). Filtering while the mixture is hot is done to eliminate or minimize any solidification and/or aggregation of fats, oils, waxes, or other materials in the heated liquid that could solidify and be filtered out at cooler temperatures, thus entrapping solvent and dissolved pigments. Thus, filtration techniques may be used so that there is minimal temperature drop or with heating of the solution of the liquid during or prior to filtration to avoid solidification of any fats, oils, or waxes. Filtering the mixture after heating using techniques so that there is a liquid temperature drop of 5° C. or less through the duration of the filtering may be suitable. Such filtration techniques may include vacuum or suction filtration techniques that result in more rapid filtration.

The *sorghum* bran solids collected after filtering may be dried to remove any remaining solvent. The collected *sorghum* powder may be discarded or be used in further extraction processing, as has been described wherein the *sorghum* powder is used in subsequent sequential treatments. Thus, *sorghum* bran with the pigments removed may be further processed to extract other compounds. Similarly, *sorghum* powder that is treated to extract pigments may be *sorghum* bran that has been previously treated to remove one or more of the other classes of phytochemicals, as discussed previously.

After filtration, the liquid filtrate is collected and the solvent is evaporated off to concentrate the pigments. Various methods may be used to achieve this, such as common distillation techniques. This may include those techniques wherein the solution is heated to the boiling point of the solvent to distill off the solvent. Vacuum distillation techniques may also be used, with or without heating. Commercial distillation equipment or solvent evaporation techniques may be used where larger quantities of material are involved. The evaporated solvent may be collected for reuse, if desired.

Solid pigment materials can be precipitated from the concentrated solution of pigments by adjusting the pH of the solution. This may be achieved by the addition of strong acids or bases. In testing, the addition of 10 M NaOH, for example, resulted in the formation of a scarlet solid precipitate. The addition of 12 M HCl resulted in a bluish/purple precipitate. These precipitated solids were water soluble, producing colors ranging from red to orange to yellow to brown. The precipitate solids may be collected through filtration techniques, washed, and dried. In certain *sorghum* varieties (both red and white), the pigments were extracted at levels of 0.15 to $0.5\%_{w/w}$ relative to the original weight of unprocessed *sorghum* bran.

Waxes

To remove and separate waxes from the *sorghum* bran, the *sorghum* material is combined with a suitable solvent and a wax extraction agent. The solvent used may be a C3 to C4 alcohol or a mixture of such alcohols. Examples of such solvent alcohols for waxes include isopropyl alcohol, n-propyl alcohol, n-butanol, etc. The amount of solvent used may be enough to provide a concentration of from 0.5 lb to 5.0 lbs of *sorghum* bran per gallon of solvent, more particularly from 0.5 lb to 1.5 lbs of *sorghum* bran per gallon of solvent, and still more particularly from 0.8 lb to 1.2 lbs of *sorghum* bran per gallon of solvent.

The wax extraction agent is typically a hydroxide-containing compound. Various hydroxide-containing basic (i.e., pH>7) compounds may be used. In particular, potassium hydroxide (KOH) and sodium hydroxide (NaOH) have been found to be highly suitable extraction agents for the waxes. Potassium hydroxide and sodium hydroxide are particularly useful because they are both strong bases and readily dissolve in the alcohol solvent. The amount of wax extraction agent, such as KOH and/or NaOH, used with the *sorghum* powder is selected to facilitate extraction of waxes from the *sorghum* material. This may be from 0.5% to $5\%_{w/w}$ of extraction agent relative to the *sorghum* material, more particularly from 1% to $3\%_{w/w}$ of extraction agent relative to the *sorghum* material, with $2\%_{w/w}$ of extraction agent relative to the *sorghum* material being particularly useful.

The *sorghum* bran, solvent, and wax extractant are combined in an appropriate vessel, and the mixture is heated to facilitate extraction of the waxes. The heating may be carried out while agitating the mixture within the vessel (e.g., stir tank reactor) to maintain the *sorghum* material in a substantially suspended state within the solvent so that it does not readily settle out. The agitation may be carried out through the use of a suitable mechanical stirring mechanism(s) (e.g., propeller), although other agitation means may be used.

The heating may be carried out at temperatures of from 50° C. to 150° C. Typically, the heating temperature may be limited to the boiling temperature of the particular solvent or solvent mixture used. Thus, for isopropyl alcohol, the boiling point is about 82.6° C. Solvent vapors that evolve from the mixture during heating may be condensed and recycled back to the mixture. A reflux condenser or similar equipment may be used for this purpose. The equipment may be commercial apparatus that is configured for and/or scaled in size for producing commercial quantities of the waxes from the *sorghum* powder using similar techniques.

Heating, which may be at the boiling point of the solution, is carried out for an amount of time sufficient to ensure that the waxes are effectively extracted from the *sorghum* powder. Heating for less than 1½ hours may produce proportionately lower levels of waxes being extracted. Heating for periods longer than 2 hours has been shown not to increase the levels of waxes extracted from the *sorghum* material, however. Thus, the heating may be carried out for a period of at least 1½ hours to 2 hours to account for different rates of extraction of waxes in certain applications.

After heating, the mixture is immediately filtered or filtered with heating during or prior to filtration to remove the *sorghum* solids from the mixture. The solids constitute the *sorghum* powder. The filter media may be any suitable filter medium sufficient to filter out the *sorghum* bran particles (e.g., cloth, paper, glass fiber, or sintered glass). Filtering while the mixture is hot is done to eliminate or minimize any solidification and/or aggregation of the waxes in the heated liquid that could solidify at cooler temperatures. Thus, filtration techniques should be used so that there is minimal temperature drop or with heating of the solution of the liquid to avoid solidification of waxes. Filtering the mixture using filtering techniques so that there is a liquid temperature drop of 5° C. or less through the duration of the filtering step may be suitable. Such filtration techniques may include vacuum or suction filtration techniques that result in more rapid filtration.

The solid *sorghum* powder collected after filtering may be dried to remove any remaining solvent. The *sorghum* powder may then be discarded or be used in further extraction processing, as has been described wherein the *sorghum* powder is used in subsequent sequential treatments. Thus, *sorghum* powder with the waxes removed may be further processed to extract other compounds. Similarly, *sorghum* powder that is treated to remove waxes may be *sorghum* powder that has previously been treated to remove one or more of the other classes of phytochemicals, such as fats and oils, pigments, and/or antioxidants, as discussed previously.

Depending upon the *sorghum* material used, the resulting filtrate may have different properties. If unprocessed *sorghum* bran is used, the extraction filtrate may have a bright yellow color. This may be due to the presence of small amounts of fats and oils. If the *sorghum* material has been previously treated to remove fats and oils, however, the extraction filtrate is less yellow or even colorless. This color or lack of color carries over to the final solid waxes that are eventually formed.

After filtration, the liquid filtrate is collected and cooled to room temperature or cooler to facilitate solidification of the waxes. The cooled mixture is then filtered using a suitable filter medium to filter out the solidified waxes. This may include vacuum filtration or similar filtration techniques.

The resulting filtrate may still contain or be saturated with wax. Removal of solvent can facilitate collection of additional waxes. This can be done through distillation or other techniques where the solvent is evaporated. Additional waxes can then be solidified and collected through cooling and filtration.

Different varieties of *sorghum*, both red and white (cream), have been found to contain different levels of extractable wax. The amount of wax appears to be due to both genetic (variety/cultivar) and environmental (soil, water, temperature, stress influences, etc. during growth) factors. Certain varieties have been found to produce wax product yields of 20% to 30%$_{w/w}$ relative to the weight of unprocessed *sorghum* bran.

Antioxidants

*Sorghum* plant components of certain varieties or cultivars have been found to contain at least three classes of chemical compounds that have antioxidant properties. One such class of antioxidants is called anthocyanins, a family of water-soluble flavonoids that are present in pigments in *sorghum* seeds. The molecular structures of these compounds all contain a common three-ring skeleton composed of two regular aromatic rings bound together by an aromatic oxygen-containing ring. Different combinations of —H, —OH, and —OCH$_3$ groups on the seven binding carbon atoms of the three rings has produced more than 500 known structures. Some *sorghum* pigments have been chemically identified as forms of apigeninidins and luteolinidins. Anthocyanins are thought to provide relatively weak antioxidant activity after extractions.

A second class of antioxidant compounds found in *sorghum* is the tocopherols. Tocopherols are an eight-member family of methylated phenols, many of which have vitamin E activity. The molecular structures of these compounds all contain one aromatic ring bound to a non-aromatic oxygen-containing ring bound in turn to a 13-carbon hydrophobic side chain. The single aromatic ring contains one hydroxyl group or phenol. The aromatic ring, the non-aromatic ring, and the aliphatic chain have various numbers of methyl groups bound to available carbon atoms. A subgroup of compounds called tocotrienols have three double bonds between carbon atoms on the side chain. Both tocopherols and tocotrienols are fat-soluble antioxidants that provide medium antioxidant activities.

A third class of antioxidant compounds found in *sorghum* plants is polyphenols. The molecular structures of these compounds are all highly substituted flavones that contain a common three-ring skeleton composed of two regular aromatic rings bound together by a non-aromatic oxygen-containing ring. Only eight naturally occurring flavone antioxidant compounds are known, and *sorghum* seeds contain at least two of them. These are apigenin, which has three hydroxyl groups, and luteolin, which has four hydroxyl groups. The multiple hydroxyl groups of these compounds give rise to the expression "polyphenol" used to designate these strong oxidant compounds.

All three classes of antioxidant compounds (anthocyanins, tocopherols, and polyphenols) can be extracted simultaneously from unprocessed *sorghum* bran. In certain applications, it has been found that *sorghum* bran that has been subjected to prior extractions for fats and oils, pigments, and/or waxes will produce a cleaner and more easily processed extraction solution of antioxidants. In particular, the extraction methods of the invention are useful in enhancing the quality of extracted polyphenol antioxidants.

In the extraction of polyphenol antioxidants, the *sorghum* material is combined with a suitable solvent and an antioxidant extraction agent. The solvent is typically an alcohol. Low molecular weight alcohols, such as methanol and ethanol, and their mixtures are particularly useful as solvents. In particular applications, methanol is used as the solvent due to its low boiling point and ease of distillation.

The amount of methanol or other solvent used should be sufficient to provide a stirrable mixture when combined with the *sorghum* bran. The amount of solvent used may be enough to provide a concentration of from 0.5 lb to 5.0 lbs of *sorghum* bran per gallon of solvent, more particularly from 0.5 lb to 1.5 lbs of *sorghum* bran per gallon of solvent, and still more particularly from 0.8 lb to 1.2 lbs of *sorghum* bran per gallon of solvent.

The antioxidant extraction agent is typically a hydroxide-containing compound. Various hydroxide-containing basic (i.e., pH>7) compounds may be used. In particular, potassium hydroxide (KOH) and sodium hydroxide (NaOH) have been found to be highly suitable extraction agents for the antioxidants. Potassium hydroxide and sodium hydroxide are particular useful because they are both strong bases and readily dissolve in the alcohol solvent. The amount of KOH and/or NaOH or other extraction agent used with the *sorghum* material being treated is selected to facilitate extraction of antioxidants. This may be from 5% to 25%$_{w/w}$ of extraction agent per gram of *sorghum* material. In particular embodiments, from 7.5% to 20%$_{w/w}$ of extraction agent per gram of *sorghum* material may be used, more particularly from 8% to 15%$_{w/w}$ of extraction agent per gram of *sorghum* material, with 9% to 11%$_{w/w}$ of extraction agent per gram of *sorghum* material being particularly useful.

The *sorghum* bran, solvent, and antioxidant extractant are combined in an appropriate vessel, and the mixture is heated to facilitate extraction of the antioxidants. The heating may be carried out while agitating the mixture within the vessel (e.g., stir tank reactor) to maintain the *sorghum* material in a substantially suspended state within the solvent so that it does not readily settle out. The agitation may be carried out through the use of a suitable mechanical stirring mechanism(s) (e.g., propeller), although other agitation means may be used.

The heating may be carried out at temperatures of from 50° C. to 100° C. Typically, the heating temperature may be limited to the boiling temperature of the particular solvent or solvent mixture used. Thus, for methanol, the boiling point is about 64.7° C. For ethanol, the boiling point is about 78.4° C. Solvent vapors that evolve from the mixture during heating may be condensed and recycled back to the mixture. A reflux condenser or similar equipment may be used for this purpose. The equipment may be commercial apparatus that is configured for and/or scaled in size for producing commercial quantities of the antioxidants from the *sorghum* powder using similar techniques.

Heating, which may be at the boiling point of the solution, is carried out for an amount of time sufficient to facilitate extraction of the antioxidants from the *sorghum* material. Different varieties of *sorghum* may have antioxidants that are released into solution at different rates. Heating for less than 1½ hours may produce proportionately lower levels of antioxidants being extracted from the various varieties; heating for periods longer than 2 hours has been shown not to increase the levels of antioxidants extracted from the various varieties, however. Thus, the heating may be carried out for a period of at least 1½ hours or 2 hours to account for these different rates of extraction in certain applications.

After heating, the mixture may be immediately filtered or filtered with heating to remove the *sorghum* solids from the mixture. The solids constitute the undissolved *sorghum* powder. The filter media may be any suitable filter medium sufficient to filter out the *sorghum* bran particles (e.g., cloth, paper, glass fiber, or sintered glass). Filtering while the mixture is hot is done to eliminate or minimize any solidification and/or aggregation of fats, oils, waxes, or other materials in the heated liquid that could solidify and filtered at cooler temperatures, thus entrapping solvent and dissolved antioxidants. Thus, filtration techniques may be used so that there is minimal temperature drop or with heating of the solution of the liquid during or prior to filtration to avoid solidification of any fats, oils or waxes. Filtering the mixture using filtering techniques so that there is a liquid temperature drop of 5° C. or less through the duration of the filtering step may be suitable. Such filtration techniques may include vacuum or suction filtration techniques that result in more rapid filtration.

The *sorghum* bran solids collected after filtering may be dried to remove any remaining solvent. The collected *sorghum* powder may be discarded or be used in further extraction processing, as has been described wherein the *sorghum* bran is used in subsequent sequential treatments. Thus, *sorghum* powder from which the antioxidants have been extracted may be further processed to extract other compounds. Similarly, the *sorghum* powder that is treated to remove antioxidants may be *sorghum* powder that has been previously treated to remove one or more of the other three classes of phytochemicals, such as fats and oils, pigments, and/or waxes, as discussed previously.

After the initial filtration, the liquid filtrate may be cooled to room temperature or lower temperature and filtered again. This subsequent filtration of the cooled filtrate facilitates removal of any undesirable solids, such as previously unremoved waxes.

After filtration, the liquid filtrate is collected, and the solvent is evaporated off to concentrate the antioxidants. Various methods may be used to achieve this, such as common distillation techniques. This may include those techniques wherein the solution is heated to the boiling point of the solvent to distill off the solvent. Vacuum distillation techniques may also be used, with or without heating. Commercial distillation equipment or solvent evaporation techniques may be used where larger quantities of material are involved. The evaporated solvent may be collected for reuse, if desired.

The concentrated antioxidant solution may be used as a final antioxidant product or subjected to further purification processing by chemical and/or chromatographic separation techniques. The bran of certain varieties of *sorghum* (both red and white) yields antioxidant products in the range of 1000 ppm to 3000 ppm$_{w/w}$ of antioxidant relative to unprocessed *sorghum* bran.

The following examples serve to further illustrate the invention.

EXAMPLES

Example 1

Unprocessed *sorghum* bran produced by mechanical milling of whole *sorghum* seeds to remove the outer 25% to 35% by weight of the whole *sorghum* seed was treated to extract fats and oils. *Sorghum* bran in an amount of 113.5 grams was combined with a commercial grade n-hexane solvent in an amount of 950 mL, which equates to a weight-to-volume ratio for the *sorghum* bran and solvent of 1.0 lb/gal.

Extractions were carried out in two different types of ground-glass apparatus. These were a 3-L Soxhlet extraction system and a 2-L reflux extraction system. In both systems, the mixture was heated to a temperature of approximately 68° C. (i.e., the boiling point of n-hexane) for a period of 2 hours.

In the Soxhlet extraction trials, the wet *sorghum* bran held in the suspended Soxhlet extraction vessel was transferred while hot (i.e., <5° C. temperature drop) into a Buchner funnel on a vacuum filtration system to remove as much hexane solution as possible, which was then combined with the product solution. In the reflux extraction, the hot mixture (i.e., <5° C. temperature drop) was filtered through a Buchner funnel on a vacuum filtration system to separate the *sorghum* powder from the liquid extraction product. The solid *sorghum* material collected from both extraction methods was either discarded or used in subsequent extractions of other phytochemicals.

In both extractions techniques, the hexane solvent was evaporated off by distillation or rotary evaporation techniques to provide a clear, bright yellow liquid product. The distilled or evaporated hexane solvent was recycled for further use. The liquid product was thermally stable with a boiling point well above 150° C. Chemical tests indicated no measurable levels of waxes, pigments, or antioxidants. The liquid product of fats and oils collected had a weight equivalent of from 6% to 12%$_{w/w}$ of the unprocessed *sorghum* bran used in the extraction.

Example 2

*Sorghum* powder, both unprocessed *sorghum* bran and that recovered from extraction of fats and oils in Example 1, was treated to extract pigments. *Sorghum* bran powder in an amount of 113.5 grams was combined with a methanol or ethanol solvent in an amount of 950 mL, which equates to a weight-to-volume ratio of the *sorghum* bran and solvent of 1.0 lb/gal.

Extractions were carried out in either a 3-L Soxhlet extraction system or a 2-L reflux extraction system. In both systems, the mixture was heated to the boiling point of the solvent for a period of 2 hours. An electric hotplate with a magnetic stirrer was used to heat the 2-L Erlenmeyer flask in the reflux extraction. An electric heating mantle was used to heat the 3-L round-bottom flask in the Soxhlet extraction.

The mixtures were filtered while hot (i.e., <5° C. temperature drop) by vacuum filtration. The solid *sorghum* material collected from both extraction methods was either discarded or used in further extractions of other phytochemicals.

In both extraction methods, the solvents were evaporated off by distillation or rotary evaporation techniques. The resulting pigment product was a thick, dark red sludge that could be further treated to provide solid precipitates of different colors. In certain instances, a 10 M NaOH solution was added to the pigment product to produce a solid scarlet or red precipitate. In other instances, the pigment product was treated with a 12 M HCl solution to produce a solid bluish/purple precipitate. Precipitates ranging in color from red to orange to yellow to brown were produced by treating the pigment product with bases or acids ranging in pH from 1 to 13. In certain *sorghum* varieties (both red and white), the pigment dyes were extracted and precipitated to yield solids having weights equivalent to 0.15% to 0.5%$_{w/w}$ of unprocessed *sorghum* bran.

Example 3

*Sorghum* powder, both unprocessed *sorghum* bran and solid *sorghum* powder recovered from extraction of pigments in Example 2, was treated to extract waxes. The *sorghum* bran in an amount of 113.5 grams was combined with 2.27 g of KOH and 950 mL of isopropyl alcohol solvent, which equates to a weight-to-volume ratio for the *sorghum* bran and solvent of 1.0 lb/gal.

Due to the non-volatile nature of the hydroxide extraction agent, the extractions were carried out in a 2-L reflux extraction system using an electric hotplate equipped with a magnetic stirrer to heat and stir the 2-L flask. The mixture was heated to a temperature of approximately 83° C. (i.e., the boiling point of isopropyl alcohol) for a period of 2 hours.

The extraction mixture was filtered while hot (i.e., <5° C. temperature drop) by vacuum filtration through double Whatman #1 paper filters. The collected *sorghum* material was either discarded or used in subsequent extractions of other phytochemicals.

Depending upon whether unprocessed *sorghum* bran or *sorghum* powder previously treated to extract fats and oils was used, a different filtrate product was obtained. If unprocessed *sorghum* bran was used, the filtrate had a bright yellow color, indicating the presence of significant amounts of fats and oils. If the *sorghum* bran had undergone previous extraction for fats and oils, the filtrate was less yellow or almost colorless. The color or lack of color carried through to the final solid wax product.

The liquid wax filtrate was further cooled to room temperature or cooled in an icebath to facilitate formation of solid wax in the solution. The cooled/chilled mixture was filtered through double Whatman #1 paper filters using vacuum filtration to collect the solid wax.

Additional wax was collected from the filtrate by evaporating the isopropyl alcohol solvent using either a rotary evaporator or a distillation system. Additional wax solids were obtained as the reduced-in-volume filtrate was cooled and filtered again.

Selected *sorghum* varieties were found to produce wax products that had a weight equivalent of from 20% to 30%$_{w/w}$ of the unprocessed *sorghum* bran. Infrared spectral analysis of the wax indicated it was chemically identical to carnuba wax.

Example 4

*Sorghum* powder, both unprocessed *sorghum* bran and *sorghum* material recovered from extraction of waxes in Example 3, was treated to extract antioxidants. The *sorghum* bran in an amount of 113.5 grams was combined with 11.35 g of KOH (to provide 10%$_{w/w}$ KOH relative to *sorghum*) and 950 mL of light alcohol solvent of methanol or ethanol, which equates to a weight-to-volume ratio for the *sorghum* bran and solvent of 1.0 lb/gal. In testing, heavier alcohols such as isopropyl alcohol and butanol did not effectively extract antioxidant products.

The extractions were carried out in a 2-L reflux extraction system using an electric hotplate equipped with a magnetic stirrer to heat and stir the 2-L flask. The mixture was heated to the temperature of the solvent boiling point for a period of 2 hours. Extraction periods of less than 2 hours gave lower levels of antioxidant products, while extraction periods of greater than 2 hours did not yield higher levels of antioxidants.

Additionally, extractions carried out using less than 10%$_{w/w}$ KOH relative to *sorghum* bran gave lower levels of antioxidant product, while greater amounts did not yield higher levels of antioxidants.

The mixtures were filtered while hot (i.e., <5° C. temperature drop) by vacuum filtration through double Whatman #1 paper filters. The solid *sorghum* material collected was discarded. The liquid product filtrate was cooled to room temperature or cooled with an ice bath and filtered through double Whatman #1 filter papers. The collected solids were discarded. The clear liquid filtrate was further processed to remove solvent by evaporation through distillation or using a rotary evaporator. The concentrated antioxidant filtrate was saved as a final antioxidant product or subjected to chemical and/or chromatographic processing to further separate and purify the polyphenol antioxidants.

Selected *sorghum* varieties (both red and white) were found to produce polyphenol antioxidant products having weight equivalents of 1000 ppm to 3000 ppm$_{w/w}$ relative to the unprocessed *sorghum* bran. Essentially identical yields of extracted polyphenol antioxidants were obtained from both unprocessed *sorghum* bran and *sorghum* bran from which fats and oils, waxes, and pigments had been previously extracted.

Example 5

A replicate series of polyphenol antioxidant extractions was carried out on various *sorghum* seed materials and other comparable plant materials known to contain polyphenol antioxidants. The *sorghum* seed test materials were all of the same variety of *sorghum* and consisted of whole seeds, ground whole seeds, ground resin (the inner portion of milled *sorghum* seed used in extrusion processes), and bran powder (i.e., outer 40% or less by weight of the whole seeds). Other plant test materials consisted of rice bran powder, flaxseed whole ground meal, chamomile tea, and ground parsley flakes.

In each extraction trial, 50 grams of plant material, 5.0 grams of KOH extractant reagent, and 500 mL of methanol solvent were mixed in a 2-L Erlenmeyer flask equipped via ground glass joints to a reflux condenser connected to a refrigerated circulator with a coolant set a 0° C. A large Teflon-coated magnetic stirrer was used to keep the mixture in constant movement, and an electric hotplate was used to keep the mixture heated to the boiling point of the methanol solvent for 1½ hours.

When the reflux extraction was completed, the hot mixture was rapidly filtered through Whatman #1 filter paper, using a vacuum filter. The solid test plant material was discarded, and the filtrate pH was adjusted to 5.5 with 5 M HCl. The filtrate was chilled in an icebath for 1½ hours and filtered through Whatman #1 filter paper. Any collected solids (e.g., waxes, etc.) were discarded, and the filtrate was diluted to 500 mLs with methanol. A test sample was saved for later analysis by high performance liquid chromatography (HPLC), and the remaining filtrate was distilled to recycle the methanol solvent.

After extraction trials were completed for all plant test materials, an analytical HPLC system was employed to identify and quantify the polyphenol antioxidant (PPAO) signals observed in each test sample. A primary standard from Sigma-Aldrich consisting of 100 ppm apigenin and 50 ppm luteolin in methanol was used for identification and calibration of polyphenol antioxidant signals.

With the exception of the chamomile tea test material, all extraction test samples showed well-defined HPLC signals readily identified as the polyphenol antioxidants. The chamomile tea test sample exhibited a very large HPLC signal that effectively masked the zone at which the polyphenol signal should appear.

The magnitude (e.g., area) of the HPLC signals for the *sorghum* seed components clearly showed that the vast majority of the polyphenol antioxidants were found in the parts of the seed which make up the bran powder.

The results of the first series of extractions are presented in Table 1 below.

TABLE 1

Extraction Series 1

| Sample Name (sample weight/solvent volume) | Area PPAO signal | ppm PPAO filtrate | ppm PPAO solid sample |
|---|---|---|---|
| Apigenin/Luteolin standard | 5.290E07 | 150.0 | |
| Sorghum whole seeds (1 g/10 mL) | 4.537E06 | 12.9 | 129 |
| Sorghum seeds, ground (1 g/10 mL) | 3.598E07 | 102.0 | 1,020 |
| Sorghum resin, ground (1 g/10 mL) | 1.494E07 | 42.4 | 424 |
| Sorghum bran/powder (1 g/10 mL) | 1.038E08 | 294.3 | 2,943 |
| Rice bran/powder (1 g/10 mL) | 1.197E08 | 339.4 | 3,394 |
| Flaxseed whole ground meal (1 g/10 mL) | 2.282E07 | 64.7 | 647 |
| Chamomile tea (1 g/10 mL) | 1.455E08* | 412.5 | 4,125 |
| Parsley flakes, ground (1 g/10 mL) | 7.710E07 | 218.6 | 2,186 |

*Chamomile tea did not give an HPLC signal that matched the Apigenin/Luteolin reference signal. Rather, it was incorporated into a very broad signal of unknown origin.

Example 6

To evaluate the reproducibility and validity of the results of the first series of polyphenol antioxidant extractions of the various *sorghum* seed components and other plant materials, a second series of extractions was performed using identical experimental parameters and equipment. HPLC analyses were performed using the same instruments and standards, and determinations of extracted polyphenol antioxidants were made using the same method of calculation.

The results of the second series of extractions are presented in Table 2 below.

TABLE 2

Extraction Series 2

| Sample Name (sample weight/solvent volume) | Area PPAO signal | ppm PPAO filtrate | ppm PPAO solid sample |
|---|---|---|---|
| Apigenin/Luteolin standard | 5.273E07 | 150.0 | |
| Sorghum whole seeds (1 g/10 mL) | 4.551E06 | 13.0 | 130 |
| Sorghum seeds, ground (1 g/10 mL) | 3.742E07 | 106.4 | 1,064 |
| Sorghum resin, ground (1 g/10 mL) | 1.387E07 | 39.4 | 394 |
| Sorghum bran/powder (1 g/10 mL) | 9.984E07 | 284.0 | 2,840 |
| Rice bran/powder (1 g/10 mL) | 1.180E08 | 335.6 | 3,356 |
| Flaxseed whole ground meal (1 g/10 mL) | 2.317E07 | 67.4 | 674 |
| Chamomile tea (1 g/10 mL) | 1.472E08* | 418.7 | 4,187 |
| Parsley flakes, ground (1 g/10 mL) | 7.357E07 | 209.3 | 2,093 |

*Chamomile tea did not give an HPLC signal that matched the Apigenin/Luteolin reference signal. Rather, it was incorporated into a very broad signal of unknown origin.

Example 7

A third series of extractions was carried out to optimize the PPAO signal. To increase HPLC signals, 100 gram test materials were used for whole *sorghum* seeds, ground *sorghum* seeds, ground *sorghum* resin, and flaxseed whole ground meal. To decrease HPLC signals, 25 gram test materials were used for *sorghum* bran, rice bran, chamomile tea, and ground parsley flasks. All extractions used 500 mL of methanol.

The results of the third series of extractions are presented in Table 3 below.

TABLE 3

Extraction Series 3

| Sample Name (sample weight/solvent volume) | Area PPAO signal | ppm PPAO filtrate | ppm PPAO solid sample |
|---|---|---|---|
| Apigenin/Luteolin standard | 5.240E07 | 150.0 | |
| Sorghum whole seeds (1 g/5 mL) | 9.140E06 | 26.2 | 131 |
| Sorghum seeds, ground (1 g/5 mL) | 7.022E07 | 201.0 | 1,005 |
| Sorghum resin, ground (1 g/5 mL) | 2.567E07 | 73.5 | 367 |
| Sorghum bran/powder (1 g/20 mL) | 6.176E07 | 176.8 | 3,535 |
| Rice bran/powder (1 g/20 mL) | 6.069E07 | 173.7 | 3,475 |
| Flaxseed whole ground meal (1 g/5 mL) | 3.933E07 | 112.6 | 563 |
| Chamomile tea (1 g/20 mL) | 8.349E07* | 239.0 | 4,780 |
| Parsley flakes, ground (1 g/20 mL) | not found** | | |

*Chamomile tea did not give an HPLC signal that matched the Apigenin/Luteolin reference signal. Rather, it was incorporated into a very broad signal of unknown origin.
**The PPAO signal merged into an adjacent large composite signal of unknown origin.

While the invention has been shown in only some of its forms, it should be apparent to those skilled in the art that it is not so limited, but is susceptible to various changes and modifications without departing from the scope of the invention. Accordingly, it is appropriate that the appended claims be construed broadly and in a manner consistent with the scope of the invention.

I claim:

1. A method of extracting phytochemical products from *sorghum* comprising:
   treating a *sorghum* material comprising removed outer portions of whole *sorghum* seeds, the removed outer portions constituting those portions of the outer 40% or less by weight of the whole *sorghum* seeds, the treatment comprising treatment c) and optionally one or more of treatments a), b) and d), wherein:
   treatment (a) comprises:
   1) combining the *sorghum* material with a C5 to C7 hydrocarbon solvent or mixture of such solvents to form a mixture A;
   2) heating the mixture A to approximately the boiling point of the C5 to C7 hydrocarbon solvent or solvent mixture for a period of at least 1½ hours;
   3) filtering the mixture A to obtain an extractant solution filtrate A and separated solid *sorghum* materials product A; and
   4) evaporating the C5 to C7 hydrocarbon solvent from the extractant solution filtrate A to obtain a product containing at least one of fats and oils;
   treatment (b) comprises:
   1) combining the *sorghum* material with a solvent of at least one of methanol and ethanol to form a mixture B;
   2) heating the mixture B to the approximate boiling point of the at least one of methanol and ethanol solvent for a period of at least 1½ hours;
   3) filtering the mixture B to obtain an extractant solution filtrate B and a separated solid *sorghum* materials product B;
   4) evaporating the at least one of methanol and ethanol solvent from the extractant solution filtrate B to obtain a concentrated solution product B of pigments; and
   5) adjusting the pH of the concentrated solution product B of pigments to form a precipitated pigment product B;
   treatment c) comprises:
   1) combining the *sorghum* material with a solvent of a C3 to C4 alcohol and a wax extractant agent to form a mixture C, the wax extractant agent being a hydroxide-containing chemical agent used in an amount of from 1%$_{w/w}$ to 3%$_{w/w}$ relative to the *sorghum* material being treated;
2) heating the mixture C to a temperature of the approximate boiling point of the C3 to C4 alcohol solvent for a period of at least 1½ hours;
3) filtering the mixture C at a temperature of not more than 5° C. below the boiling point of the C3 to C4 alcohol solvent to obtain an extractant solution filtrate C and a separated solid *sorghum* materials product C;
4) cooling the extractant solution filtrate C to facilitate solidification of waxes in the filtrate C; and
5) filtering the filtrate C to obtain a separated solid wax product C; and treatment d) comprises:
1) combining the *sorghum* material with a solvent of at least one of methanol and ethanol and a hydroxide extraction agent to form a mixture D;
2) heating the mixture D to the approximate boiling point of the at least one of methanol and ethanol solvent for a period of at least 1½ hours;
3) filtering the mixture D while at a temperature of not more than 5° C. below the boiling point of the at least one of methanol and ethanol solvent to obtain an extractant solution filtrate D and a separated solid *sorghum* materials product D; and
4) evaporating at least a portion of the at least one of methanol and ethanol solvent from extractant solution filtrate D to form an antioxidant product D.

2. The method of claim 1, wherein:
at least two of treatments (a)-(d) are performed; and wherein
at least one of the separated solid *sorghum* materials products A-D is used in at least one other of the treatments (a)-(d) as the *sorghum* material being treated.

3. The method of claim 1, wherein:
treatment (d) is performed; and wherein
the hydroxide extraction agent of treatment (d) is a hydroxide-containing chemical agent used in an amount of from 5%$_{w/w}$ to 15%$_{w/w}$ relative to the *sorghum* material being treated.

4. The method of claim 1, wherein:
the removed outer portions of the whole *sorghum* seeds constitutes approximately the outer 25% to 40% by weight of the whole *sorghum* seeds.

5. The method of claim 1, wherein:
the removed outer portions of the whole *sorghum* seeds constitutes approximately the outer 25% to 35% by weight of the whole *sorghum* seeds.

6. The method of claim 1, wherein:
the outer portions of the whole *sorghum* seeds are removed by milling.

7. The method of claim 1, wherein:
treatment (d) is performed; and wherein
the hydroxide extraction agent is at least one of NaOH and KOH.

8. The method of claim 1, wherein:
treatment (d) is performed; and wherein
the hydroxide extraction agent comprises KOH.

9. The method of claim 8, wherein:
the KOH is used in an amount of from 5%$_{w/w}$ to 15%$_{w/w}$ relative to the *sorghum* material being treated.

10. The method of claim 7, wherein:
the solvent of at least one of methanol and ethanol of treatment (d) comprises ethanol.

11. A method of extracting phytochemical products from *sorghum* comprising:

treating a *sorghum* material comprising removed outer portions of whole *sorghum* seeds, the removed outer portions constituting those portions of the outer 40% or less by weight of the whole *sorghum* seeds, the treatment comprising treatments a)-d), wherein:

treatment (a) comprises:
1) combining the *sorghum* material with a C5 to C7 hydrocarbon solvent or mixture of such solvents to form a mixture A;
2) heating the mixture A to approximately the boiling point of the C5 to C7 hydrocarbon solvent or solvent mixture for a period of at least 1½ hours;
3) filtering the mixture A to obtain an extractant solution filtrate A and separated solid *sorghum* materials product A; and optionally
4) evaporating the C5 to C7 hydrocarbon solvent from the extractant solution filtrate A to obtain a product containing at least one of fats and oils;

treatment (b) comprises:
1) combining the separated solid *sorghum* materials product A with a solvent of at least one of methanol and ethanol to form a mixture B;
2) heating the mixture B to the approximate boiling point of the at least one of methanol and ethanol solvent for a period of at least 1½ hours;
3) filtering the mixture B to obtain an extractant solution filtrate B and a separated solid *sorghum* materials product B; and optionally
4) evaporating the at least one of methanol and ethanol solvent from the extractant solution filtrate B to obtain a concentrated solution product B of pigments; and
5) adjusting the pH of the concentrated solution product B of pigments to form a precipitated pigment product B;

treatment c) comprises:
1) combining the separated solid *sorghum* materials product B with a solvent of a C3 to C4 alcohol and a wax extractant agent to form a mixture C;
2) heating the mixture C to a temperature of the approximate boiling point of the C3 to C4 alcohol solvent for a period of at least 1½ hours;
3) filtering the mixture C at a temperature of not more than 5° C. below the boiling point of the C3 to C4 alcohol solvent to obtain an extractant solution filtrate C and a separated solid *sorghum* materials product C; and optionally
4) cooling the extractant solution filtrate C to facilitate solidification of waxes in the filtrate C; and
5) filtering the filtrate C to obtain a separated solid wax product C; and treatment d) comprises:
1) combining the separated solid *sorghum* materials product C with a solvent of at least one of methanol and ethanol and a hydroxide extraction agent to form a mixture D;
2) heating the mixture D to the approximate boiling point of the at least one of methanol and ethanol solvent for a period of at least 1½ hours;
3) filtering the mixture D while at a temperature of not more than 5° C. below the boiling point of the at least one of methanol and ethanol solvent to obtain an extractant solution filtrate D and a separated solid *sorghum* materials product D; and
4) evaporating at least a portion of the at least one of methanol and ethanol solvent from extractant solution filtrate D to form an antioxidant product D.

12. The method of claim 11, wherein:

the wax extractant agent of treatment (c) is a hydroxide-containing chemical agent used in an amount of from $1\%_{w/w}$ to $3\%_{w/w}$ relative to the *sorghum* material being treated.

13. The method of claim 11, wherein:

the hydroxide extraction agent of treatment (d) is a hydroxide-containing chemical agent used in an amount of from $5\%_{w/w}$ to $15\%_{w/w}$ relative to the *sorghum* material being treated.

14. The method of claim 11, wherein:

the removed outer portions of the whole *sorghum* seeds constitutes approximately the outer 25% to 40% by weight of the whole *sorghum* seeds.

15. The method of claim 11, wherein:

the hydroxide extraction agent is at least one of NaOH and KOH.

16. The method of claim 11, wherein:

the hydroxide extraction agent comprises KOH.

17. The method of claim 16, wherein:

the KOH is used in an amount of from $5\%_{w/w}$ to $15\%_{w/w}$ relative to the *sorghum* material being treated.

18. The method of claim 11, wherein:

the solvent of at least one of methanol and ethanol of treatment (d) comprises ethanol.

19. The method of claim 11, wherein:

the removed outer portions of the whole *sorghum* seeds constitutes approximately the outer 25% to 35% by weight of the whole *sorghum* seeds.

20. The method of claim 11, wherein:

the outer portions of the whole *sorghum* seeds are removed by milling.

\* \* \* \* \*